June 8, 1937.     T. A. WETTIG     2,083,414
RAIL CHUCK FOR MACHINE TOOLS
Filed June 6, 1936     2 Sheets-Sheet 1

INVENTOR.
THEODORE A. WETTIG.
BY
Allen & Allen
ATTORNEYS.

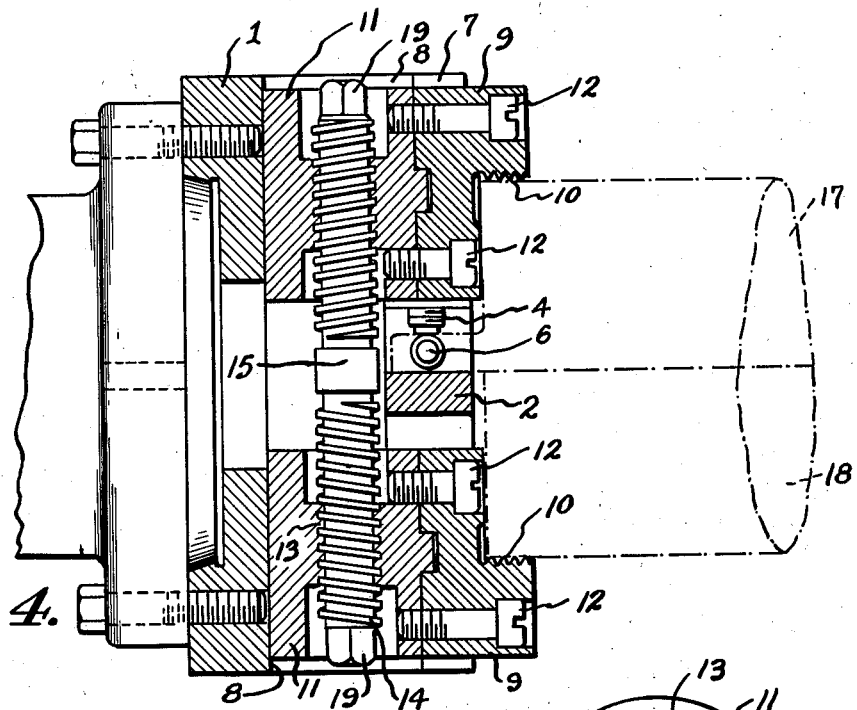
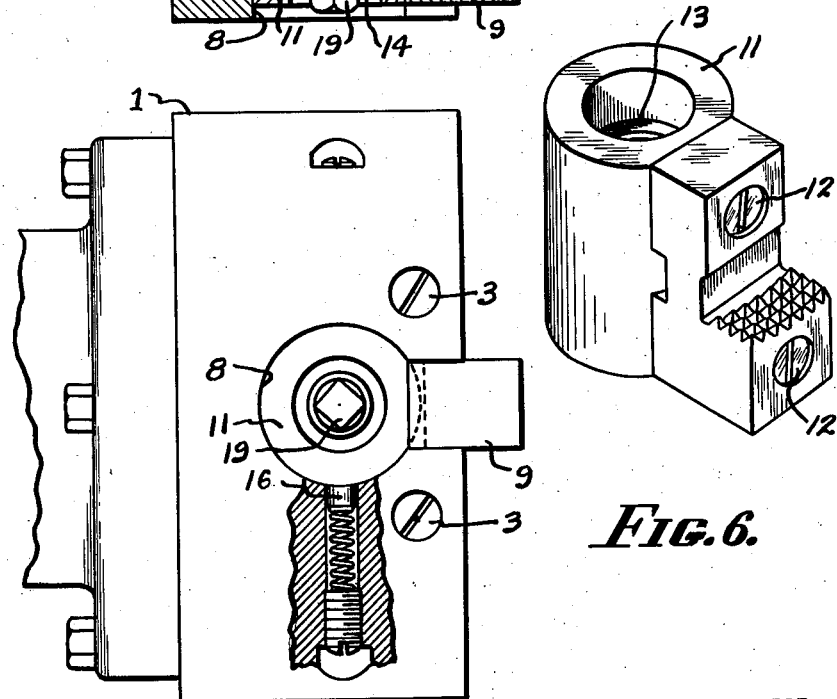

Patented June 8, 1937

2,083,414

UNITED STATES PATENT OFFICE 2,083,414

RAIL CHUCK FOR MACHINE TOOLS

Theodore A. Wettig, Cincinnati, Ohio

Application June 6, 1936, Serial No. 83,972

7 Claims. (Cl. 279—1)

My invention relates to rail chucks for machine tools.

Heretofore it has been customary to make rail chucks having clamping screws for clamping work against the rail. The clamps for several pieces of work to be tooled have been so arranged that the clamping of each piece of work with respect to the rail and to the chuck shell is likely to disalign the other pieces of work. Further strains are exerted against the chuck mechanism which tend to develop a "bell-mouthed" condition of the clamping jaws. Both of these disadvantages makes precision work unlikely.

It is the object of my invention to provide a rail clamp having screws independent of the clamping jaws for clamping lugs or extensions of one of a plurality of pieces of work against the rail, and to then provide clamping jaws which have an interrelated adjustability which clamps the several pieces of the work together without disaligning the positions in which one of the pieces has already been clamped.

I further have as an object the provision of a rail chuck having jaws adjustable by means of a floating screw. In my application Serial No. 81,274, filed May 22, 1936, I have disclosed a chuck in which one of a plurality of pieces of work may extend through the chuck body and be clamped against a rail by means of one of a plurality of clamping jaws. Another or other jaws may then be employed to clamp other pieces of work with respect to the originally clamped piece. The variation from the specific example disclosed in this copending application and the present application relates to a chuck in which one of several pieces of work is first clamped against the rail and in which the clamping jaws have relative adjustability to clamp the various pieces of work together. The broad principle of adjustability by means of free floating mechanism for actuating chuck clamping jaws is disclosed both in this and my other application to which I have referred.

The above objects and other objects to which reference will be made in the ensuing description, I accomplish by that certain combination and arrangement of parts of which I have depicted a preferred typical construction, so as to enable others skilled in the art to fully apprehend the underlying features of my invention in the various ways contemplated thereby. Referring to the drawings:

Fig. 4 is a sectional view taken along the lines 4—4 in Fig. 1.

Fig. 5 is a side elevation of the chuck.

Fig. 6 is a perspective view of one of the clamping jaws together with the jaw carrying block.

Figure 1:
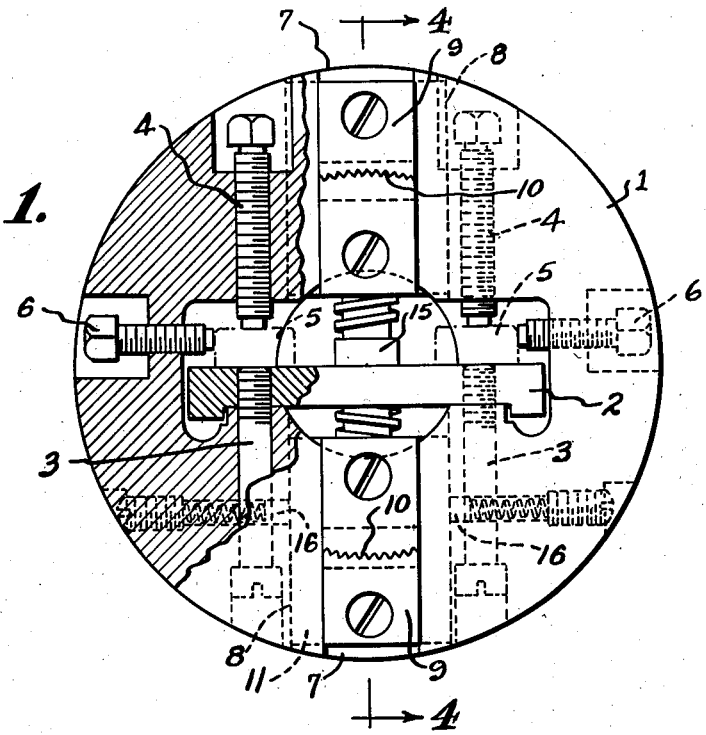
Figure 1 is a front elevation of the chuck with parts broken away to reveal the internal construction.

The shell of the chuck is indicated at 1. A rail 2 is fixedly mounted in the shell and properly positioned therein by means of bolts 3.

Clamping bolts 4 are shown which are adapted to engage the lugs 5 of one of several segmental pieces which are to be combined as a unit for a tooling operation. The bolts 4 clamp the lugs 5 securely against the rail 2 and lateral adjustment of the lugs of the work is arranged for by means of the side guide bolts 6.

A channel 7 which extends to a tubular bore 8 extends through the shell. Clamping jaws 9 having jaw sectors 10 with roughened surfaces are bolted to internally threaded jaw blocks 11 by means of bolts 12.

The internal threads 13 of the blocks or bushings 11 engage the threads 14 of a free floating screw 15.

Since the screw 15 is free floating, I have provided frictional bearing members 16 which bear against the sides of one of the blocks 11 and thereby retain or arrest the jaws while loading or unloading the chuck to keep them from falling out of place.

Figure 2:
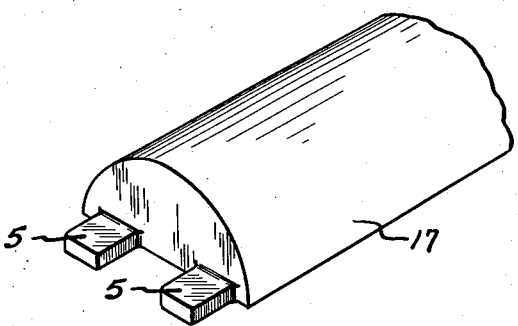
Fig. 2 is a perspective view of one of several pieces of work to be retained in the chuck preparatory to a tooling operation thereon.
Figure 3:
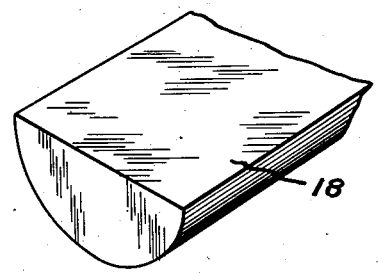
Fig. 3 is a perspective view of another segment of work to be combined with the segment shown in Fig. 2 to be operated on as a unit therewith.

The particular chuck of which I have shown a preferred embodiment is adapted to retain a plurality of pieces of work usually of segmental shape, such as are illustrated at 17, 18 in Figs. 2 and 3. While the lugs 5 which are originally clamped against the rail 2 may vary widely as to size and shape, my invention contemplates the original positioning of one of the segments of the work which is to be tooled as a unit before the socket receiving heads 19 of the free floating screw are actuated to clamp the several pieces of work securely together.

I have found that by first positioning one of the several pieces of work to be tooled and then clamping the other pieces of work to the first noted pieces that there is no tendency for the position of the first noted piece to be displaced in the chuck. By means of my arrangement, I am able to secure a precision of lathe operation heretofore accomplished only with the most extreme care in the adjustment of the clamping jaws of old and well-known chucks.

Having thus described my invention, what I claim as new and desire to secure by Letters Patent, is:

1. A rail chuck having a plurality of jaws for clamping a plurality of pieces of work together prior to a tooling operation thereon comprising in combination with a rail means independent of said jaws for clamping one of said pieces of work against said rail, said jaws provided with means adjustable for clamping said pieces of work together after one of said pieces has been clamped in position.

2. A rail chuck provided with means in combination with a rail for clamping one of a plurality of pieces of work against said rail and clamping jaws having a right and left screw threaded connection the adjustment of which clamps the plurality of pieces of work together.

3. A rail chuck having a rail and a plurality of jaws for clamping a plurality of pieces of work together prior to a tooling operation thereon comprising means independent of said jaws for clamping one of said pieces of work against said rail, said jaws provided with means adjustable for clamping said pieces of work together after one of said pieces has been clamped in position, said jaw clamping means comprising a floating screw.

4. A rail chuck having a rail and two jaws for clamping a plurality of pieces of work together, means independent of said jaws for locating one of said pieces of work with respect to said rail and said clamping jaws relatively adjustable for clamping said pieces of work together with respect to said located piece of work.

5. A rail chuck having a rail and two jaws for clamping a plurality of pieces of work together, means independent of said jaws for locating one of said pieces of work with respect to said rail and said clamping jaws relatively adjustable for clamping said pieces of work together with respect to said located piece of work comprising a floating screw.

6. A rail chuck having a rail and a plurality of clamping jaws which are independently adjustable with respect one to another, and means independent of the clamping jaws for clamping one, of several pieces of work being prepared as a unit for a tooling operation, to said rail.

7. A rail chuck having a rail and a plurality of clamping jaws which are cooperatively adjustable with respect one to another, and means independent of the clamping jaws for clamping one, of several pieces of work, being prepared as a unit for a tooling operation, to said rail.

THEODORE A. WETTIG.